March 2, 1971  A. ROMANOWSKI ET AL  3,566,440
APPARATUS FOR THE MANUFACTURE OF ARTIFICIAL, NEEDLE BEARING BRANCHES
Filed Jan. 27, 1969  3 Sheets-Sheet 1
FIG. 1.
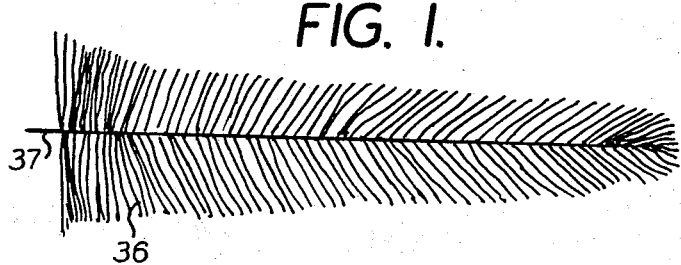
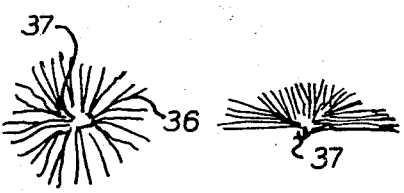  
FIG. 2a.  FIG. 2b.  FIG. 2c.  FIG. 2d.
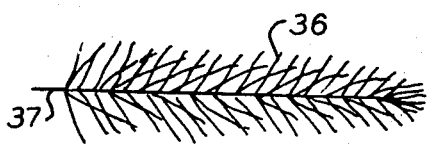 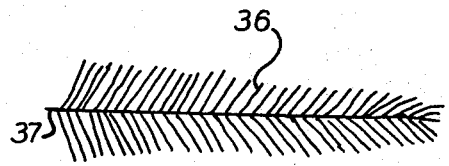
FIG. 3a.  FIG. 3b.
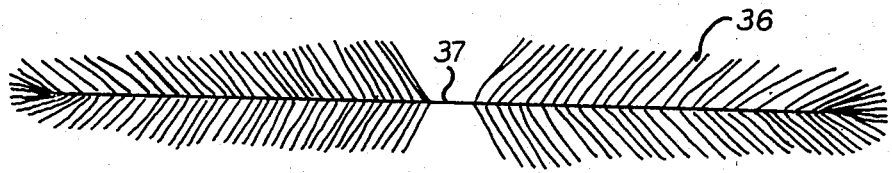
FIG. 4.
INVENTORS
ALFRED ROMANOWSKI
WILFRIED KRUEGER
BY
Burgess, Dinklage & Sprung
ATTORNEYS.

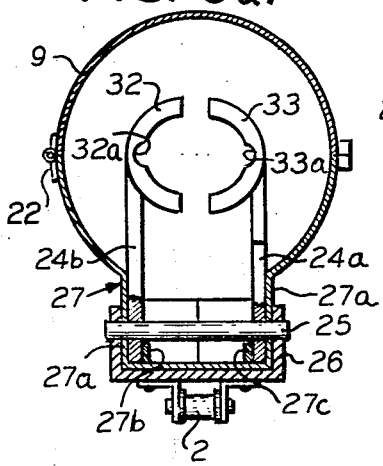
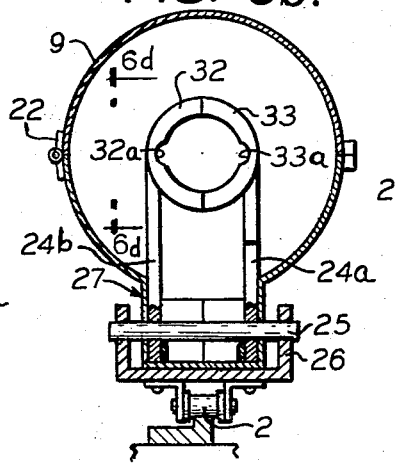
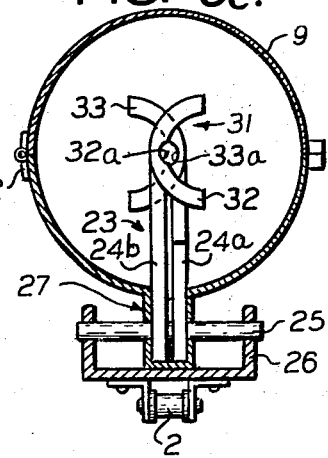
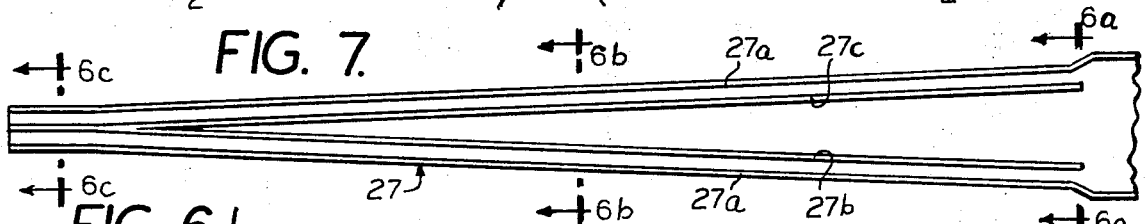
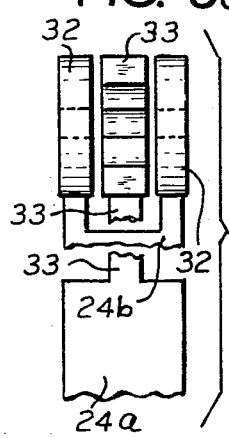
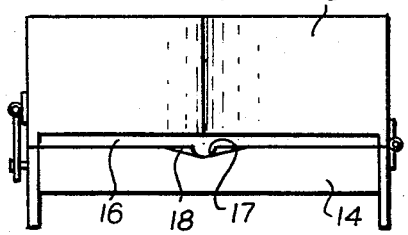
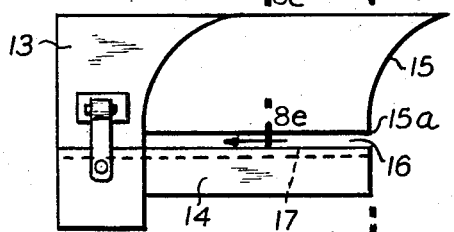
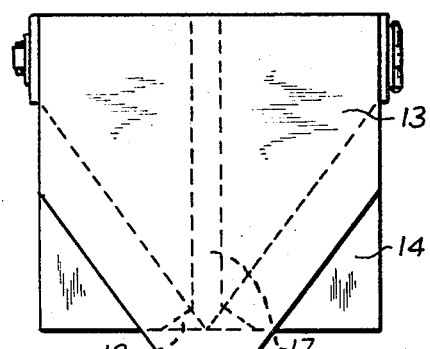
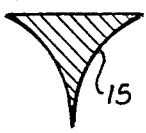
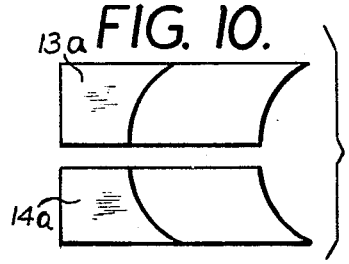
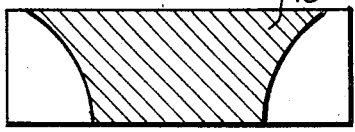
INVENTORS
ALFRED ROMANOWSKI
WILFRIED KRUEGER
BY
ATTORNEYS United States Patent Office 3,566,440
Patented Mar. 2, 1971

3,566,440
APPARATUS FOR THE MANUFACTURE OF ARTIFICIAL, NEEDLE BEARING BRANCHES
Alfred Romanowski, Kleineichen, and Wilfried Krueger, Troisdorf, Germany, assignors to Dynamit Nobel Aktiengesellschaft, Troisdorf, Germany
Filed Jan. 27, 1969, Ser. No. 793,946
Claims priority, application Germany, Jan. 26, 1968,
P 17 53 116.7
Int. Cl. B29b 3/00; B29c 1/00
U.S. Cl. 18—5          8 Claims

ABSTRACT OF THE DISCLOSURE

Process for production of artificial, needle bearing branches, such as stems or twigs, from pieces formed of a core member and needles made of thermoplastic material, projecting radially outwardly from the core member, which are in the form of cylindrical brushes, the process comprising heating the needles and drawing the cylindrical branch axially through and relative to an opening of a shaping tool. The opening is shaped so that the shaping tool works the needles during the drawing. The heating is correlated with the drawing so that needles are shaped relative to the core. The process and apparatus for practice thereof are claimed.

---

Bristles made of thermoplastics are being used widely for the manufacture of artificial Scotch pine, spruce or fir Christmas trees, Advent wreaths and cementary wreaths and garlands. They are prepared from pre-assembled branches, including stems and, twigs which resemble bottle brushes and consist of twisted wires surrounded by the plastic bristles.

To manufacture spruce or fire twigs to correspond to the different types occuring in nature, it is necessary to shape the bristles of the pre-assembled branches, or cylindrical brushes.

The invention relates to a method for the manufacture of natural-looking pine, fir or spruce twigs, etc. from pre-assembled parts in the form of cylindrical brushes which have a metal core and bristles of thermoplastic, the said method being characterized in that the brushes that are to be shaped are heated preferably to temperatures that increase towards the tips of the branches being made, the heated brushes then being shaped by means of a claw-like, hinged forming tool or pair of forming tools having an approximately elliptical or slot-shaped forming orifice whose diameters correspond to that of the cylindrical brush. The brushes are passed through the orifice and bristles are thereby aligned and/or grouped together by the fact that the diameter of the orifice is diminished during the movement and/or a wedge-shaped portion of the forming tool travels along the metal wire core of the brush.

The shaping is performed by displacing the brushes or the forming tool longitudinally of the brushes from one end of the brush to the other in the case of a single forming tool, or from the middle to both ends of the brush in the case of two forming tools, after the brushes have been heated, preferably in chambers which can be heated by a heating device from the side longitudinally of the brushes, to temperatures at which the thermoplastic involved is formable but is not yet plastic.

Thus, the invention provides a process of producing an artificial, needle bearing branch from a cylindrical brush-shaped piece formed of a core member and needles made of thermoplastic material and which project radially outwardly from the core member. The method involves heating the needles and drawing the cylindrical brush axially through and relative to an opening of a shaping tool, the opening being of a shape which works the needles during the drawing. The heating is correlated with the drawing so that the needles are shaped relative to the core by said drawing.

The heating is preferably performed in the manner that the temperature of the exit end portion (the end portion drawn through the forming tool opening, last) is above the temperature of the entering end portion of the branch. Thereby, greater response of the exit end portion to the shaping action of said opening, can be obtained. Further, the size of the opening of the shaping tool can be reduced during the drawing, to increase the shaping action during the drawing.

The heating can be such that the needles are formable at the temperature employed, but are not plastic, so that the needles, following the forming action, partially return to their original position.

The invention is further described with reference to the accompanying drawings, wherein:

FIG. 1 is a showing of a stem after shaping according to the invention;

FIG. 2a, 2b, 2c, and 2d are sectional views of stems of different forms, after shaping;

FIG. 3a and FIG. 3b are showing of stems different from the stem of FIG. 1, after shaping;

FIG. 4 is a showing of two twigs, joined together, so that they can be applied to a stem, by winding the center portion thereof about the stem;

FIG. 6a, 6b, and 6c are views along, respectively, line 6a—6a, line 6b—6b, and line 6c—6c, which lines appear in FIG. 7;

FIG. 6d is a view along line 6d—6d which line appears in FIG. 6b.

Figure 5:
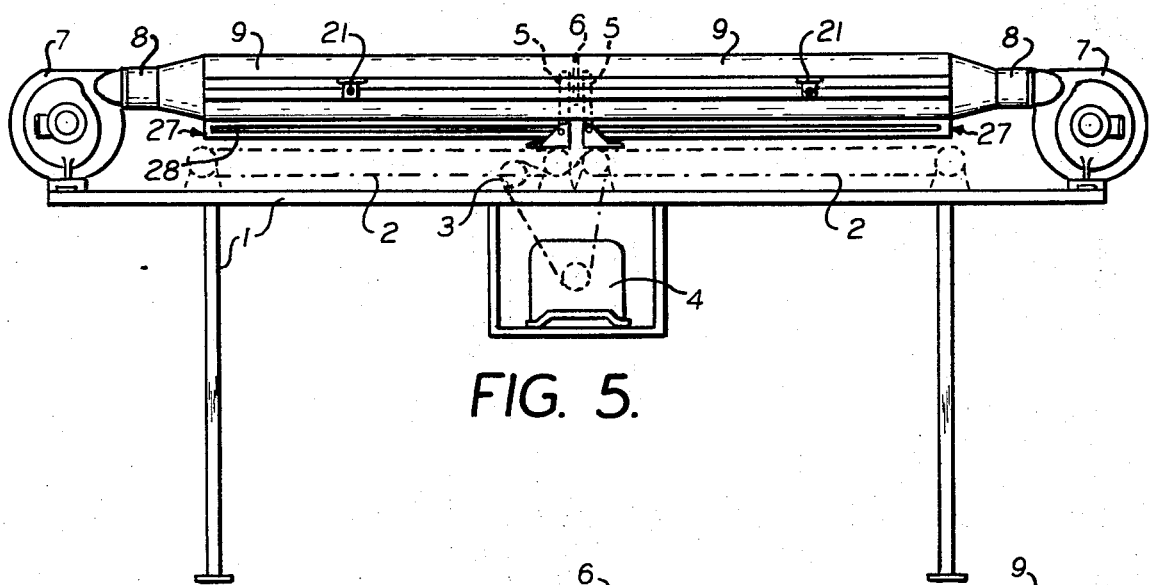
FIG. 5 is a side elevation view of apparatus for practice of the method of the invention.

FIG. 7 is a view of a part of the apparatus shown in FIG. 5;

FIG. 8a, 8b, and 8c are, respctively, front, side, and top views of a shaping tool according to the invention;

FIG. 8d is a section taken along line 8d—8d in FIG. 8b;

FIG. 8e is a section taken along line 8e—8e in FIG. 8b; and

FIG. 9a and 9b are, respectively, front and top views of another shaping tool.

FIG. 10 is a plan view of another shaping tool.

The forming entails the setting of the angle between the bristles (needles) and the center axis (core or stem), which at the butt of the branch is to amount to 90° or less than 90°, and diminishes as continuously, possible to 0°, at the tip of the twig (FIG. 1). The forming may also involve grouping of the needles around the stem so that, as shown in FIGS. 2b and 2d, the stem is laid bare on one side or on opposite sides, and the bristles (needles) are grouped into rows along the sides of the stem that have not been laid bare. The cross-sectional profiles of FIGS. 2b to 2d are characteristic of the different types of spruce and fir. The cross-sectional profile of FIG. 2a that is peculiar to all kinds of pines. The angle between the needles and stem in the fir species diminishes constantly in the cross-section of the twig from the horizontal to the vertical axis of the cross-section (FIGS. 2b and 2c), the stem being entirely covered with needles or exposed on one side, and the twig has a longitudinal section as shown in FIG. 3a. If the stem is visible on opposite sides (cross section FIG. 2d) the needles are preferably in the horizontal plane (longitudinal cross-section, FIG. 3b).

An embodiment of the apparatus of the invention is depicted in FIGS. 5–9. The apparatus comprises an elongated chamber having a clamping means spaced from one end thereof for clamping the core of the branch to hold the branch disposed axially of the chamber and extending from the clamping means to termination adjacent the mentioned end of the chamber. Heating means for passing a heating medium axially through the chamber are mounted at the mentioned end so that before the shaping or drawing operation the branch can be heated. Also included is a shaping tool and means for moving the shaping tool from the clamping means over the length of the branch to adjacent the heating means, the shaping tool including means for working of the needles during movement thereof as aforesaid.

In the embodiment shown in the drawings, the clamping means for securing the branch in the elongated chamber, is disposed at the mid-point of the chamber, and the elements for the shaping operation are provided on each side of the clamping means so that two branches can be worked at one time.

On a machine frame 1 there are mounted two drive chains 2 which are driven in opposite directions by a reversible motor through sprockets 3 and a continuously variable transmission 4. On each of the two chains is mounted a forming device 5, these forming devices running with the chains from the center of the forming apparatus toward both ends during the forming process, and returning under no load to the center at the end of the forming operation. The length of the forming travel is adjusted by limit switches (not shown). During the forming process, the prepared cylindrical brushes, which have been brought to the forming temperature, are held by a clamp 6 when the forming device is pulled over the brushes.

The preheating of the prepared brushes is performed in the forming apparatus in FIG. 5 by hot air which is delivered by the two blowers 7, and is raised to the required temperature in the heating registers 8 and then flows into the cylindrical chambers 9 in which the brushes to be formed are located. Due to the cooling of the heated air on its course from the tips of the brushes to the butts of the brushes, the desired temperature gradient is achieved in the heating of the bristles. The cylindrical chambers 9 are formed of two semi-cylinders, connected together by hinges, so that the chamber can be opened to insert the prepared brushes or for the removal or mechanical ejection of the finished twigs. Fastners 21 are provided for securing the parting edges of the semi-cylinders together.

For the manufacture of stem branches (FIGS. 1 to 3), which are fastened directly to the trunk, the shaping of the bristles on the prepared brushes is performed from one end to the tip of the stem, one round brush being inserted into each of the two chambers of the forming unit. In the case of twigs (FIG. 4), the forming is performed from the center of a round prepared brush inserted into both chambers, to the two extremities thereof.

Figure 6:
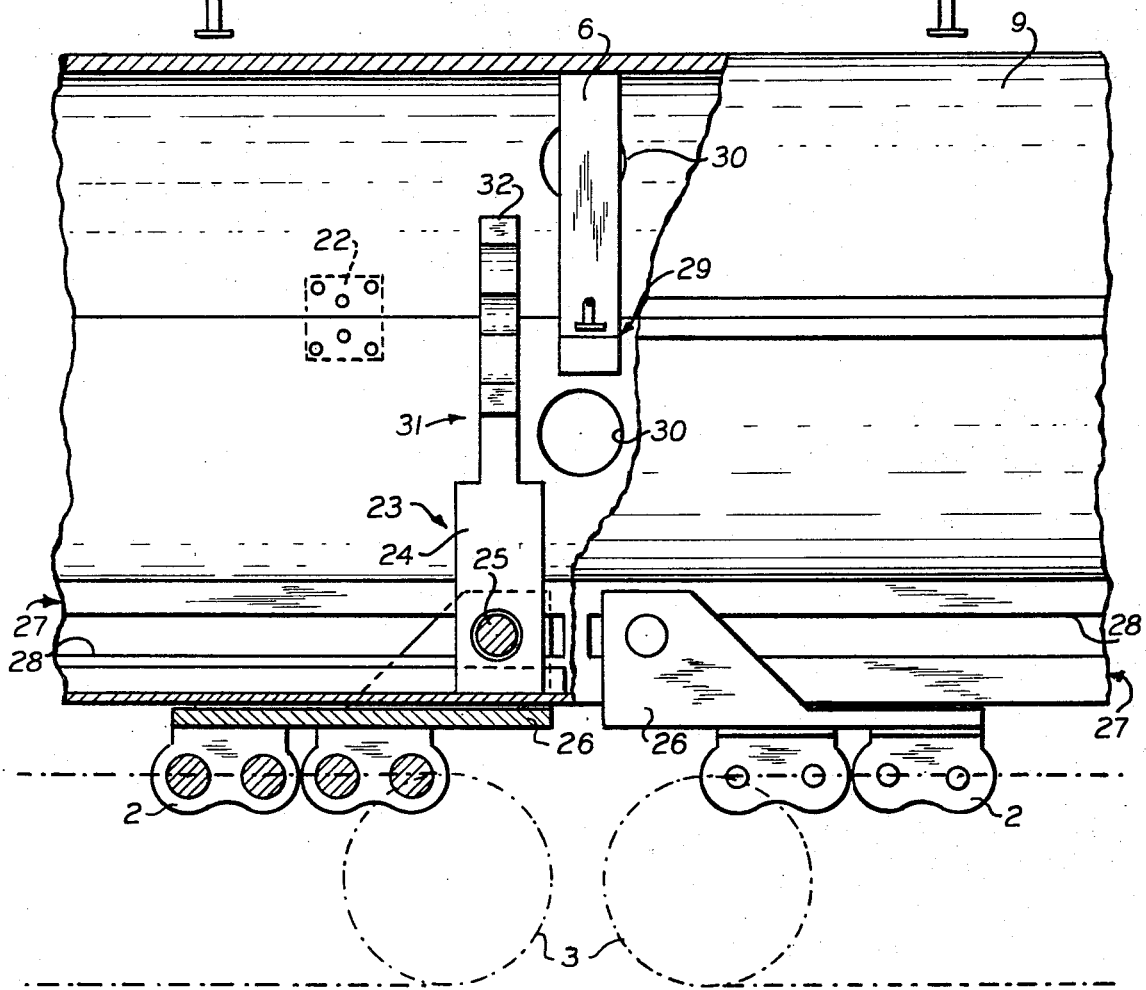
FIG. 6 is an elevation view, partially in section, of the apparatus shown in FIG. 5.

Referring to FIGS. 6–7, the shaping tool 23 includes support legs 24 on which working means 31 are mounted, and connecting pins 25, which secure the support legs to the car 26, which is fixedly mounted on the chain 2. The equipment further includes track structure 27, of which more shortly, hinges 22, which permit opening of the chamber for insertion and removal of branches, and vent holes 30 for discharge of heating air during the heating step. A slot 28 is provided in the track structure 27, permitting travel of the connecting pin 25 of the forming tool 23, over the length of the chamber 9, from its position adjacent the clamp 6, to an end of the chamber.

Referring to FIGS. 6a–6d, the working means 31 comprises two working members, namely the semi-circular piece 33 having recess 33a, mounted on support 24a, and semicircular piece 32 having recess 32a, mounted on bifurcated support 24b. See FIG. 6d, taken along line 6d—6d in FIG. 6b. These two working members 33 and 32 are disposed axially adjacent and offset with respect to each other so that the working members can be moved radially inwardly into overlapping positions. A sequence of radially different positions is indicated in the sequence FIG. 6a, FIG. 6b, and FIG. 6c. In this manner, there is provided an opening of variable size for the branch upon movement of the shaper tool 23 by the chain drive 2. The means for securing the working members 32, 33 into overlapping positions comprises a track system 27. See FIG. 5 and FIG. 7 as well as FIGS. 6–6d. The track system comprises the outer walls 27a joined, as by welding, to the elongated chamber 9, and runners 27b, 27c (FIG. 7). The lower ends of the supports 24a and 24b ride in the grooves between the outer walls 27a and, respectively, runners 27b and 27c. These grooves approach each other, moving from the center of the chamber 9 to the ends thereof, so that as the car 26 is moved by the chain 2 away from the center of the machine, the supports 24a and 24b are moved toward each other, thus reducing the size of the opening through which the branch moves, at least relatively. It will be observed that variation in the opening form can be realized by selection of the shape of the working members 32 and 33.

In alternative embodiments the shaping tool can comprise an upper member and a lower member releasably secured together in spaced relation providing an opening for passage of the branch therethrough. The opening can vary in shape along its length to displace the needles of the lower half of the branch by rotation about the branch core a relatively great angle while displacing the needles of the upper half of the branch by rotation about the branch core a relatively small amount. See FIG. 2b and FIGS. 8a–8e.

Alternatively, the variation in shape can be such that the rotaional displacement of the needles in the upper and lower halves is the same. See FIG. 2c and FIG. 10.

In still another embodiment, the opening in the shaping tool is flat as indicated in FIGS. 9a and 9b, for forming as is indicated in FIG. 2d.

The forming tools can open for the insertion of the round brushes. In the case of forming tools of FIGS. 6a–6d, having a somewhat round or elliptical opening, the halves 32, 33 of the tool are drawn apart for the insertion of the round brushes, as indicated in FIG. 6a. The forming tools of FIGS. 8a–8e and FIGS. 9a–9b, and FIG. 10 open along the horizontal plane of division, so that the inserted brush will lie in the slit-like forming orifice.

The stems or twigs are produced from the prepared cylindrical brushes by the fact that the forming devices containing the forming tool and mounted on the drive chains are pulled lengthwise over the cylindrical brushes which have been inserted into the forming orifice of the tool and are held by the clamping means 6.

If the forming temperature and its gradient along the length of the twig are properly selected, a portion of the original resilience is maintained in the needles so that, after the forming operation, the needles straighten up again to some extent, giving the twig a natural appearance.

As indicated, for the manufacture of twigs surrounded by needles on all sides in the cross sections shown in FIGS. 2a and 2c, forming tools having a somewhat rounded or ellipitical shaping orifice according to FIGS. 6a to 6d are used. However for a shaping as is indicated in FIG. 2c, a tool as depicted in FIG. 10 can be used.

The forming orifice formed by the halves 32, 33 of the forming tool is diminished during the process by the fact that the two halves, under the control of the track system 27, slide alongside one another in a scissors-like movement perpendicularly to the direction of the forming tool displacement, so that, at the beginning of the forming operation, i.e., at the butt of the twig, the more or less circular portions of the forming orifice act (FIG. 6b), while at the end of the forming process, i.e., at the tip of the twig, the lateral, half-round notches 32a, 32b in the forming orifice form a smaller round or elliptical forming orifice (FIG. 6c). (The orifices can deviate somewhat from from circular or eliptical shapes, and therefore we are drawing them as approximately round and approximately elliptical, respectively.) The constant diminution of the size of the round-to-elliptical forming orifice produces a permanent deformation that gradually increases towards the tip of the twig, diminishing the angle between the needles and stem so that an angle of nearly 0° is produced at the tip of the twig.

As noted, the change in the forming orifice is determined and controlled by the track system 27 pair of guide rails 11 shown in FIG. 7. Any desired forming of the bristles can be achieved by the suitable arrangement of the geometry of the track system. The tracks rails can be composed of straight and curved sections.

The forming devices are adjustable in height according to the diameter of the twig to be produced e.g., by making the support legs 24a and 24b each in two pieces and joining the pieces by means of slots and screws.

Forming tools having a slot-like forming orifice are used for the manufacture of twigs having cross-sections according to FIGS. 2b and 2d, in which the stem is laid bare on one side or on opposite sides. A track system wherein the gage varies (FIG. 7) is not needed for this purpose, the forming means being merely pulled by the drive chain 2 over the prepared cylindrical brushes. The upper part and lower part of this forming tool can be of identical or different in opening shape.

To manufacture branches having the cross-section 2b, a forming tool (see FIGS. 8a–8e) is used whose upper portion is wedge-shaped and has two curved faces giving it a shape similar to the prow of a ship, and whose lower portion is flat and has a guiding groove 17 for the stem, this groove having a flattened-funnel shaped flare 18 at the forward end thereof. The lower end 15a of the forward edge of the ship's bow is disposed over the forward end of the groove 17 in lower member 14. The height of the slot 16 can be made adjustable by suitable joining of the members 13 and 14 by slots and screws.

Branches of the cross-section 2d are made by using a forming tool, as indicated in FIG. 10, whose upper member 13a and lower member 14a are of a wedge-shaped construction wherein the upper member 13a is in the form of a ship's bow and the lower member is in the form of an inverted ship's bow, and the bows are aligned vertically as in FIG. 10.

If forming tools having a slot-like forming orifice corresponding to FIGS. 9a and 9b, the upper and lower members 13b and 14b being flat and having a guiding groove 19 with a flattened-funnel-shaped flare 20 at the inlet end, branches having the cross-section 2c can be made. If the slot-like forming orifice 16b, which can be made adjustable by suitable slot and screw construction, is selected to have a ratio of height to width as represented in FIG. 9, twigs having a cross-section like the one in FIG. 2c are obtained, in which the upper and lower needles form a smaller angle with the stem than the needles having a lateral placement during the forming operation (cf. longitudinal section 3a).

Forming tools having a slot-like forming orifice can be constructed so that the slot is defined laterally only by the mount that joins together the halves of the tool (see for example FIG. 8a), or so that the slot does not extend laterally all the way to the edge (see for example FIG. 9). In this manner the ratio of the length to the height of the forming orifice is variable or is fixedly established for a particular forming tool.

In a variant of the forming tools, the tool is formed in one piece and does not open as in FIG. 9, for example. In this case the cylindrical brush is not laid in the forming tool before the forming begins, and instead is held in front of the forming orifice by means of a releasable clamp.

Branches made with forming tools having a slot-like orifice (e.g. FIGS. 8a–8e) resemble flat fir twigs. The wedge-like part 13 of the tool act in the manner of a plow, distributing uniformly into the horizontal plane the bristles that have previously been distributed around the stem, so that the stem is laid bare on one or opposite sides (FIGS. 2b and 2d). The edge 15 parts the bristles on the stem and lays them horizontal by displacing the needles by rotation about the branch core. The final setting of the bristles is performed by the gap 16. If a flat bottom part 14 is used, the stem of the brush is introduced into gap 16 by means of the half-round groove 17 which is adapted to the diameter of the stem.

The flattened-funnel like flare 18 at the forward end of groove 17 in the bottom portion 13, is important in the forming process. On the width and depth of this flare depends the grouping and the density of the needles covering the stem on the opposite side of the twig (FIG. 2b). If there were no flare or only a small one, these needles would lie tight against the stem, mainly in the axial direction. The wider the flare is the looser is the arrangement of the needles, and they are oriented not just in the axial direction but also at an angle thereto. The twig thus acquires a fuller, more natural appearance.

If the forming tool of FIG. 9 is used, flat branches are also produced, the half-round grooves 19 in cooperation with the flare 20 having the previously described effect on the arrangement of the needles. The tool effects bending of the needles toward the horizontal plane towards the butt of the twig.

Referring to FIG. 1, the needles 36 can be mounted on the core 37 by forming the core of twisted metal wire which grips the needles holding them in place in known manner.

The forming of the bristles is performed at a temperature corresponding to the thermoplastic involved, at which permanent deformations are obtained, without completely softening the shaped bristles. The degree of permanent deformation depends, for a constant needle cross section, on the temperature, on the time for which it acts, and on the construction of the shaping tool. The heating medium may be gaseous or liquid: e.g., hot air, steam or hot water. Gaseous heating media can be made to pass from one end of the brush to the other, thus heating the first end to a higher temperature. When hot water is used, the brush is immersed, exposing one end of the brush for a longer time to the action of the heat. The deformation temperature can also be produced by a corresponding radiant heating system.

It is preferred that, prior to the deformation of the bristles, the round brushes be brought to a temperature that is higher at the end that is to be formed into the branch tip than at the end that is to become the butt of the branch. Thus, a greater permanent deformation is brought about the tip of the branch, permitting the described adjustment of the angle between needles and core.

The temperature difference between the tip and the butt amounts generally to no more than 30° C.; for example, in the case of bristles of polyvinyl chloride, about 60° C. at the tip and about 40° C. at the butt, so that the resiliency of the polyvinyl chloride bristle at the butt of the twig is almost entirely unaffected.

Both condensation polymers and addition polymers are suitable for making the thermoplastic bristles, e.g.: polyvinyl chloride, high-pressure and low-pressure polyethylene, polypropylene, polyamides, polyesters, phenolics, aminoplastics, and their copolymers.

The forming temperature, in the case of bristles of hard PVC or polyethylene, ranges between 50 and 100° C., and in the case of polypropylene bristles between 70 and 120° C. The thermoplastic may contain plasticizers, stabilizers, fillers, dyes, or pigments of the prior art.

Green dyes are preferred for coloring. Reflecting white fillers or sparkling metallic fillers can be used.

What is claimed is:

1. Apparatus for producing an artificial, needle bearing branch from a cylindrical brush-shaped piece formed of a core member and needles made of thermoplastic material projecting radially outwardly from the core member, comprising:
   (a) an elongated chamber,
   (b) heating means for passing a heating medium axially through said chamber from one end thereof,
   (c) clamping means for clamping the core member of the branch at a location spaced from said one end of the chamber for holding the branch disposed axially of the chamber and extending from the clamping means to termination adjacent said heating means,
   (d) a shaping tool and means for moving the shaping tool from the clamping means over the length of the branch to adjacent the heating means, said shaping tool including means for working of the needles during movement thereof as aforesaid.

2. Apparatus according to claim 1, the working means of the shaping tool comprising two working members, said two working members being disposed axially adjacent and offset with respect to each other so that the working members can be moved radially inwardly into overlapping positions, providing an opening of variable size for passage of the branch therethrough upon movement of the shaping tool by said mover means therefor, said shaping tool comprising means for moving the two working members to said overlapping positions.

3. Apparatus according to claim 2, said means for moving the two working members to overlapping positions moving the two working member to reduce the size of said opening as the shaping tool moves away from the clamping means.

4. Apparatus according to claim 1, said shaping tool means for working of the needles comprising an upper working portion and a lower working portion defining an opening for passage of the branch therethrough upon movement of the shaping tool by said mover means therefor, said opening varying in shape along its length to displace the needles of the lower half of the branch by rotation about the branch core a relatively great angle while displacing the needles of the upper half of the branch by rotation about the branch core a relatively small angle.

5. Apparatus according to claim 4, the lower working portion of the shaping tool being a flat plate having a groove therein for passage therethrough of the branch core, the upper working portion of the shaping tool having its forward end portion formed as a ship's bow, the lower end of the forward edge of which is disposed over the forward end of said groove in said lower portion, said groove flaring outwardly at its forward end.

6. Apparatus according to claim 1, said shaping tool means for working of the needles comprising an upper working portion and a lower working portion together defining an opening for passage of the branch therethrough upon movement of the shaping tool by said mover means therefor, said opening varying in shape along its length to displace the needles of the lower half and upper half of the branch by rotation about the branch core.

7. Apparatus according to claim 6, the upper working portion of the shaping tool having its forward end portion formed as a ship's bow, the lower working portion having its forward end portion formed as an inverted ship's bow, said upper end lower portions being disposed with said bows in alignment.

8. Apparatus according to claim 1, said shaping tool means for working of the needles comprising an upper working portion and a lower working portion together defining a flat opening for passage of the branch therethrough upon movement of the shaping tool by said mover means therefor, each of said portions having a groove therein for passage therethrough of the branch core, said grooves flaring outwardly at the forward end of the shaping tool.

References Cited

UNITED STATES PATENTS

| 2,885,727 | 5/1959 | Wright | 18—1 |
| 3,458,893 | 8/1969 | Diefferbach | 18—1 |

CHARLES W. LANHAM, Primary Examiner

R. L. SPICER, Jr., Assistant Examiner

U.S. Cl. X.R.

18—1; 264—322